Patented June 11, 1935

2,004,876

UNITED STATES PATENT OFFICE 2,004,876

MANUFACTURE OF ARTIFICIAL THREADS AND OTHER PRODUCTS FROM CELLULOSE COMPOUNDS

Leon Lilienfeld, Vienna, Austria

No Drawing. Application July 14, 1933, Serial No. 680,498. In Great Britain July 15, 1932

7 Claims. (Cl. 18—54)

In certain of my copending cases, as noted below, I have shown, described and claimed processes of producing artificial materials (e. g. threads, films, coatings or dressings on textiles, paper, etc. and numerous others) by forming what may be considered to be a solution of a xanthate of a cellulosic body in which one or more of the hydroxyl hydrogen atoms has been replaced by organic radicals, and then coagulating the latter in a shaped condition either by treating with a plasticizing bath (e. g. $H_2SO_4$ of at least 35% and preferably 45% or stronger, or other acid bath having a similar strength) or by coagulating said xanthate solution, in a shaped condition, with an acid having merely a coagulating action (e. g. a more dilute $H_2SO_4$ solution or other acid solution or acid salt solution or acid and salt solution) and, if desired, then treating the freshly coagulated artificial material with a plasticizing bath (as set forth above).

There are two general methods of preparing the solution of xanthates of "oxy-organo compounds of cellulose" (which term will be hereinafter used to designate the said xanthate solution, for the sake of brevity), these may be described briefly as follows:—(a) Viscose can be made as usual (or according to any known or approved formula) and to this can be added an organic material which is capable of reacting thereupon.

(b) Alkali cellulose, made for example as in the usual manner of producing viscose (or in any known or approved manner), is treated with an organic material capable of reacting on the cellulose content thereof with substitution of an organic radical in place of a hydroxyl hydrogen atom of the cellulose, after which the product is treated with carbon bisulphide, and the xanthated product is dissolved in water in the presence of alkali.

These methods are described in detail in several of my other cases, as follows:—

(a) As described and claimed in Ser. No. 435,649 filed March 13, 1930, to viscose there is added alpha dichlorohydrine, the amount of which may be equal to 10% to 40% of the weight of the cellulose used in making the viscose. Instead of α-dichlorohydrine, β-dichlorohydrine, epichlorohydrine, ethylene chlorohydrine, glycerine monochlorohydrines, or another halogen derivative of a polyhydric alcohol, such as pinacone chlorohydrine (tetramethyl-ethylene chlorohydrine), mannite chlorohydrine, erythrite chlorohydrine or dichlorohydrine, pentaerythrite chlorohydrine, mannitane chlorohydrine, dulcitan monochlorohydrine, divinyl-ethylene glycol chlorohydrine, phenyl propanol chlorohydrine, naphthyl propanol chlorohydrine, 4-methoxy naphthyl propanol chlorohydrine, and the like, as well as the analogous bromine derivatives.

The halogen derivative selected is added to the viscose and well mixed therewith, and the so-formed solution (optionally after suitable ripening) is converted into the proper shape and is treated with the plasticizing bath, or with a coagulating bath and then with a plasticizing bath.

The artificial materials can be desulphurized with $Na_2S$ solution, or equivalent, preferably with a warm or hot solution containing at least 5% of $Na_2S \cdot 9H_2O$, this step being claimed in my copending application Ser. No. 464,426, filed June 27, 1930.

In my copending application Ser. No. 464,427, filed June 27, 1930, I have described and claimed a modification of the above process, in which instead of the halogen derivatives of polyhydric alcohols, trithiocarbonic acid esters of alcohols, and particularly such esters of polyhydric alcohols (e. g. glycols, glycerine, etc.) are employed for reacting on the viscose.

In my copending application 597,640 filed March 8, 1932, I have described a further modification, according to which cellulose xanthate (preferably in the form of viscose) is treated with one or more organic compounds of the type containing a polyvalent aliphatic organic radical, to at least one carbon atom of which sulphur is attached, and to at least one other atom of which a halogen (e. g. chlorine or bromine) is attached, and which organic compounds may or may not also contain one or more hydroxyl groups. Such organic compounds can be made, for example by reacting on a dichlorohydrine with a solution containing an amount of $Na_2S$ or $NaHS$ less than the stoichiometrically equivalent of the halogen element (chlorine) in the dihalogenhydrine (e, g. dichlorohydrine). This process and product are claimed in Ser. No. 597,641.

In another copending application Ser. No. 618,801 filed June 22, 1932, I have described and claimed a further modification of the above process in which cellulose xanthate is treated with one or more organic compounds which contain an aliphatic polyvalent nucleus, to at least one carbon atom of which is attached a halogen element (e. g. chlorine), to another of which is attached nitrogen such as an $NH_2$ group or NH group, and to another of which is attached oxygen such as a hydroxyl group. Such compounds can be prepared by acting on a dihalogen hydrine, such as dichlorohydrine, with ammonia, preferably at below 100° C., and preferably dissolved in alcohol this process and product being claimed in my copending application Ser. No. 618,800 of June 22, 1932.

Solutions of xanthates of oxy-organo cellulose compounds can be produced also, as stated above (b) by acting on alkali cellulose with organic substances as therein defined, (which may be the holagenated or other compounds mentioned above) or by other substances which act in a somewhat analogous manner, then xanthating by treatment with $CS_2$ and then dissolving the xanthated product in water and a caustic alkali. Examples of these methods, are given in certain of my other cases as now to be mentioned.

In my application 435,647, filed March 1930, (now Patent 1,858,097) I have described and claimed a process in which to alkali cellulose (say a soda cellulose containing 1000 parts of air-dry cellulose and 2400 parts of NaOH solution of 18% strength) is added 100 parts (or 100 to 300 parts in some cases) of $\alpha$-monochlorhydrine, then the mass is either xanthated with 600 parts of $CS_2$, the excess of the latter blown off and the xanthated product can be dissolved in caustic alkali solution, or dissolved in caustic alkali solution and thereafter xanthated in solution. In place of the $\alpha$-monochlorhydrine, equivalents can be used as stated under 435,649, above.

In Ser. No. 435,648 I have described and claimed the making of artificial materials by treating such solutions of xanthates of oxy-organo cellulose compounds as are produced under Patent 1,858,097, by treating the same, in a shaped condition with a plasticizing agent, e. g. $H_2SO_4$ of 35%, preferably 45% or stronger, or other mineral acid of similar strength. Or, in place of this latter treatment, I can first introduce the shaped xanthate solution into a dilute acid having merely a coagulating action thereon, and then (if desired) treat the freshly coagulated material with an acid solution having a plasticizing action thereon, such as $H_2SO_4$ of 35% and preferably 45% or stronger.

In Ser. No. 521,017 filed March 7, 1931, I have described and claimed the making of artificial materials (including threads) by a process which differs from the preceding by the treatment of the alkali cellulose with an etherifying agent (an alkylating agent, an aralkylating agent or a halogen fatty acid or salt thereof), then xanthating the thus obtained product in one of the manners described above in connection with Ser. No. 435,647, dissolving in caustic alkali and water, shaping the solution of the xanthate, coagulating and plasticizing the product, as described above.

In my Patent 1,910,440, May 23, 1933, I have described and claimed an analogous process in which cellulose, in the presence of an alkali, is reacted upon a cyclic ether of the type ethylene oxide, the product xanthated, dissolved in alkali solution, and coagulated and plasticized.

Many other organic substances can likewise react with the alkali cellulose, the reaction product xanthated and the xanthate solution shaped, coagulated and (optionally) plasticized. In my copending case 556,719 of August 12, 1931, I have described the employment of the following, for that purpose, the following list:—

Di-halogen paraffines, for example compounds of the type ethylene chloride or tri-methylene chloride (which may be regarded as halogen hydracid esters of dihydric paraffin alcohols (glycols) or of the type of methylene chloride (which may be regarded as neutral halogen hydracid esters of glycols with two hydroxyl groups attached to one and the same carbon atom).

Poly-halogen paraffins.

Halogen olefins (halogen substitution products of unsaturated hydrocarbons).

Halogen derivatives of ethers of mono-hydric alcohols.

Halogen derivatives of aldehydes or ketones.

Sulphochlorides of tertiary amines, such as, for example, the sulphochloride of dimethyl-aniline.

Halogen derivatives of higher fatty acids having at least 6 carbon atoms.

Halogen derivatives of olefine mono-carboxylic acids.

Halogen alkylamines or halogen aralkyl-amines.

Halogen derivatives of oxy-acids, for example $\beta$-di-chloro-lactic acid or $\beta$-tri-chloro-lactic acid.

Halogen derivatives of keto-carboxylic acids.

Halogen derivatives of nitro-methane, such as chloro-picrin.

Urea halides, alkyl-urea halides, aralkyl-urea halides and aryl-urea halides.

Tri-thiocarbonic acid esters.

Halogen derivatives of cyanogen, such as cyanogen halides or cyanuric halides (tri-cyanogen halides).

Halogen derivatives of di-carboxylic acids, such as halogen succinic acid.

Organic acid esters and inorganic acid esters of di- or polyhydric alcohols (other than halogen hydracid esters).

Some halogen derivatives of hydrocarbons of the type $C_nH_{2n+2}$, for example tri-chlorohydrin 1:2:3-tri-chloropropane).

Sulphochlorides of hydrocarbons, such as ortho- or para- toluene sulphochloride, naphthalene sulpho-chloride.

Halogen derivatives of halogenated alkyl phenyl ethers, such as benzoylated chloro-anisol.

Acid esters of phenols, for example phenyl carbonate or phenyl-ethyl carbonate.

Acid halides, for example benzoyl halides, malonyl halides, di-ethyl malonyl halides.

Halogen derivatives of aromatic mono-carboxylic acids.

Halogen hydracid esters of phenyl glycols or phenyl glycerines or of their derivatives, for example ethers.

Phenyl alkylene oxides.

Phenyl-halogen-fatty acids, for example phenyl-chloro-acetic acid or phenyl-chloro-propionic acid.

Halogen derivatives of phenyl-paraffin-alcohols acids, for example phenyl-halogen-lactic acid or phenyl-halogen-oxy-propionic acid.

Phenyl-acetylene.

Halogen derivatives of olefine-benzols.

Halogen derivatives of phenyl-olefine alcohols or oxy-phenyl-olefine alcohols.

Halogen derivatives of pseudophenols, methylene quinones and quinols, for example ortho-oxy-mesityl chloride or piperonyl chloride.

Sulphochlorides of phenyl-mono-oxy-carboxylic acids, such as salicylic acid or cresotinic acid and chloro- or nitro-substitution products thereof.

Halogen derivatives of condensed nuclei, for example $\alpha$-naphthalene-mono-halides or halogenated naphthalenes.

Halogen derivatives of hydro-naphthalene compounds, for example di-hydro-naphthalene-di-bromide or tetra-hydro-naphthalene-glycolchlorhydrin.

Halogen derivatives of heterocyclic compounds having one nitrogen atom in the ring, for example halogen derivatives of pyridine or of its homologues, or halogen derivatives of quinoline or of its homologues, or halogen derivatives of iso-quinoline or of its homologues.

Sulphochlorines of heterocyclic compounds which contain one nitrogen atom in the ring, for example quinoline or pyridine.

In my copending application 618,802, of June 22, 1932, I have described and claimed the production of artificial materials from a xanthated solution which has been prepared by acting on alkali cellulose with an organic material which contains hydroxyl attached to at least one carbon atom, and contains a halogen element attached to at least one other of the carbon atoms thereof and at least one sulphur group (e. g.—SH) attached to still another of the carbon atoms thereof, and the said compound of alkali cellulose then xanthated by $CS_2$, and dissolved.

Also in said application 618,802, there is described the treatment of viscose with a compound of a polyvalent organic radical containing at least one nitrogen atom attached to a carbon atom, at least one oxygen atom attached to a carbon atom and at least one acid residue (preferably a halogen atom) attached to a carbon atom (the three being preferably attached to different carbon atoms). Such products can be made by reacting on a dichlorhydrine with ammonia, at a temperature preferably below 100° C.

In all of the above cases it is to be understood that the solution of a xanthate of an oxy-organo cellulose compound is, after being formed into the desired shape (e. g. into the shape of a thread-like stream) treated for being coagulated and plasticized, whereby products (e. g. threads) of high dry and wet tenacity, and high (or at least moderate) extensibility (i. e. extensibility not below about 7–9% and in some cases substantially higher) are produced. But the present invention is not limited to the treatment of products which have been so plasticized.

It will be understood that in many instances, it is entirely feasible to include both the treatment of the alkali cellulose with the organic reacting agents above described, and also the treatment of the xanthate (viscose) therewith, or in other words to add some of the organic reacting agent (one or a mixture of several) to the alkali cellulose, and to add some more of the same or a different reacting agent (one or a mixture of several) after the xanthation step (and optionally after the dissolving step).

The said organic reagent, whether added at one or both of the stages of the process indicated, may be insufficient to modify all of the cellulose present in the final xanthate solution, so that in such cases the final solution from which the artificial materials are to be regenerated, will contain some unmodified cellulose xanthate along with one or more xanthates of oxy-organo cellulose compound, whereby upon regeneration there is produced a mixture of cellulose with an oxy-organo derivative of cellulose.

I have now found it is sometimes difficult to purify the artificial materials (including artificial threads) produced as described above, from such xanthates of oxy-organo cellulose compounds, or mixtures thereof with viscose, without impairing their extensibility and in some cases also their tensile strength and feel, by any methods heretofore known. The present invention involves a process, one object of which is to accomplish such purification without such injuries to the said products. And the present invention also includes a similar treatment of artificial materials produced by coagulating (and optionally plasticizing) ordinary viscose.

The present invention is based on the observation that well purified products having excellent dyeing and other properties are obtained when artificial materials prepared from the products which are obtainable by the above mentioned processes are subjected to desulphurization by the new process described below. Such new process involves the treatment of the artificial materials produced as per any of the above mentioned processes:—

(1) with an alkali sulphide solution at a temperature not exceeding 25° C. and thereafter (2) with an alkali sulphide solution at a temperature exceeding 40° C., preferably exceeding 50° C.

The process may be conducted by treating the artificial materials, (by immersion or spraying or any other method known in the desulphurizing art) for a longer or shorter time with an alkali sulphide solution at a temperature below 25° C., and thereafter the alkali sulphide solution with which the artificial material in hand is being treated, is heated to a temperature exceeding 40° C. and kept at that temperature for a shorter or longer time. As an alternative, the artificial material is treated first with an alkali sulphide solution at not above 25° C. and then with another alkali sulphide solution of same or different strength which solution has been preheated to a temperature exceeding 40° C.

The following examples illustrate the present invention which, however, is in no way limited to these examples:

*Example 1*

A dry or wet skein of artificial silk produced according to one of the processes described in my U. S. applications No. 435,649 or Ser. No. 464,427 or Ser. No. 435,648 or Ser. No. 521,017 or Ser. No. 521,018 or Ser. No. 556,719 or Ser. No. 597,640 or Ser. No. 618,801 or Ser. No. 618,802 is immersed in an aqueous solution of $Na_2S.9H_2O$ of 30 per cent. (equal to about 9.75% actual $Na_2S$) strength at 15° C., where it remains for 10 to 20 minutes, whereupon the solution is quickly heated to 100° C., and the skein kept therein for another 10 to 20 minutes at 100° C. After that time, the skein is removed from the sodium sulphide solution, washed with hot water, then with cold water and, after having been soured, if desired, with dilute sulphuric acid (for example, of 10 per cent. strength), thoroughly washed and dried.

*Example 2*

A dry or wet skein of artificial silk produced according to one of the processes described in my U. S. applications Ser. No. 435,649 or Ser. No. 464,427 or Ser. No. 435,648 or Ser. No. 521,017 or Ser. No. 521,018 or Ser. No. 556,719 or Ser. No. 597,640 or Ser. No. 618,801 or Ser. No. 618,802 is immersed in an aqueous solution of $Na_2S.9H_2O$ of 30 per cent. strength at 15° C., where it remains for 10 to 20 minutes. Thereupon the skein is removed from the alkali sulphide solution and transferred to an alkali sulphide solution of the same strength which has been pre-heated to 100° C. After having remained in this solution for about 10 to 20 minutes, it is washed with hot water, then with cold water and, after having been soured, if desired, by means of dilute sulphuric acid (for example, of 10 per cent. strength), again washed and dried.

*Example 3*

The process is conducted as in Example 2, but with the difference that the first alkali sulphide solution contains 43 and the second 58 per cent. of $Na_2S.9H_2O$.

*Example 4*

The process is conducted as in Example 1, but with the difference that the alkali sulphide solution contains 58 per cent. of $Na_2S.9H_2O$.

*Example 5*

The process is conducted as in Example 2, but with the difference that both alkali sulphide solutions contain 58 per cent. of $Na_2S.9H_2O$.

*Example 6*

The process is conducted as in any one of the Examples 1 to 5, but with the difference that the temperature used in the second step is not 100°, but 60° C.

*Example 7*

The process is conducted as in any one of the Examples 1, 2, 4, 5 and 6, but with the difference that the sodium sulphide solution contains only 10 per cent. of $Na_2S.9H_2O$ (equal to about 3.25% actual $Na_2S$).

*Example 8*

The process is conducted as in Example 2 or 5, but with the difference that the second bath contains only 10 per cent. of $Na_2S.9H_2O$.

The expression "cellulosic body" used in the claims is intended to include cellulose, cellulose conversion products and cellulose derivatives capable of being xanthated.

The expression "cellulose" used in the description and claims means, wherever the context permits, cellulose and its near conversion products, such as cellulose hydrate, hydrocellulose or oxycellulose.

What I claim is:—

1. Process for refining artificial materials, made from a solution containing a xanthate of an oxy-organo derivative of cellulose by wet spinning, which process comprises treating the artificial materials first with an alkali sulphide solution of desulphurizing strength, at a temperature not exceeding 25° C. and thereafter with an alkali sulphide solution at a temperature exceeding 40° C.

2. A process as claimed in claim 1, wherein both treatments are performed in one and the same bath.

3. A process as claimed in claim 1, wherein the treatment is performed in two separate baths.

4. A process as claimed in claim 1, wherein the alkali sulphide solution used in both treatments contains not less than 30 per cent. of the alkali metal sulphide (figured as crystallized sodium sulphide).

5. A process as claimed in claim 1, wherein the two treatments are carried out with two separate sulphide solutions, and wherein the alkali sulphide solution used in the second treatment contains alkali metal sulphide equivalent to not less than 30 per cent. of crystallized sodium sulphide.

6. A process as claimed in claim 1, wherein the second treatment is conducted at a temperature not substantially lower than 100° C.

7. Process for refining artificial materials made from a solution containing a xanthate of an oxy-organo compound of cellulose, by coagulation and plasticizing a shaped solution of said xanthate, which process comprises treating the artificial materials first with an alkali sulphide solution at a temperature not exceeding 25° C. and thereafter with an alkali sulphide solution at a temperature exceeding 50° C., said sulphide solutions being of a strength suitable for desulphurizing said artificial materials.

LEON LILIENFELD.